(12) United States Patent
Vegesna et al.

(10) Patent No.: US 10,705,785 B2
(45) Date of Patent: Jul. 7, 2020

(54) DATA RENDERING ON LOCAL AND REMOTE DISPLAYS

(71) Applicant: Zoho Corporation Private Limited, Pleasanton, CA (US)

(72) Inventors: Ramakrishna Raju Vegesna, San Jose, CA (US); Sudheer A. Grandhi, Pleasanton, CA (US)

(73) Assignee: Zoho Corporation Private Limited, Kancheepuram District (IN)

( * ) Notice: Subject to any disclaimer, the term of this patent is extended or adjusted under 35 U.S.C. 154(b) by 0 days.

(21) Appl. No.: 15/456,214

(22) Filed: Mar. 10, 2017

(65) Prior Publication Data

US 2017/0185367 A1    Jun. 29, 2017

Related U.S. Application Data

(63) Continuation of application No. 14/977,220, filed on Dec. 21, 2015.

(60) Provisional application No. 62/095,771, filed on Dec. 22, 2014.

(51) Int. Cl.
| | |
|---|---|
| *G06F 3/0482* | (2013.01) |
| *G06F 3/14* | (2006.01) |
| *G06T 11/20* | (2006.01) |
| *G06F 3/0346* | (2013.01) |
| *G06F 3/0481* | (2013.01) |
| *G09G 5/00* | (2006.01) |

(52) U.S. Cl.
CPC .......... *G06F 3/1454* (2013.01); *G06F 3/0346* (2013.01); *G06F 3/0482* (2013.01); *G06T 11/206* (2013.01); *G06F 3/04815* (2013.01); *G09G 5/003* (2013.01); *G09G 2370/16* (2013.01)

(58) Field of Classification Search
None
See application file for complete search history.

(56) References Cited

U.S. PATENT DOCUMENTS

| | | | |
|---|---|---|---|
| 7,257,778 B2 | 8/2007 | Kekki et al. | |
| 8,229,715 B1* | 7/2012 | Teller | G06F 17/50 434/72 |
| 8,232,990 B2 | 7/2012 | King et al. | |
| 8,514,221 B2 | 8/2013 | King et al. | |
| 2010/0309228 A1* | 12/2010 | Mattos | G06F 1/1626 345/654 |
| 2011/0045906 A1 | 2/2011 | Berman | |

(Continued)

OTHER PUBLICATIONS

Vegesna et al., Sep. 17, 2017 Non-Final Office action in U.S. Appl. No. 14/977,220, filed Dec. 21, 2015 (17 pages).

(Continued)

*Primary Examiner* — Said Broome
(74) *Attorney, Agent, or Firm* — Arthur Behiel; Mark Lauer; Silicon Edge Law Group LLP

(57) ABSTRACT

Described are an apparatus and method for interactively retrieving data from one or more data sources and rendering the data in a three dimensional (3D) format. The rendering may be displayed on a hand-held device, e.g., a smart phone or tablet computer, or on a remote display device such as another phone, tablet, screen, or a projector. The apparatus and method may operate in response to one or more inputs or orientation sensors, e.g., proximity, gravimeter, gyroscope, photo, and touch sensors.

27 Claims, 11 Drawing Sheets

(56) References Cited

U.S. PATENT DOCUMENTS

2011/0109546 A1    5/2011  Milne et al.
2012/0089947 A1*  4/2012  Lee ..................... G06F 3/0483
                                                          715/839
2012/0262379 A1*  10/2012  King .................... G06F 3/1454
                                                          345/173

OTHER PUBLICATIONS

Wroblewski, Touch Gesture Reference Guide, Apr. 19, 2010, web page printout.
Chart, Wikipedia, Aug. 18, 2014, web page printout.
Heller, 'Sexy' iPad Maps: A Designer's Interactive New York Streetscapes, The Atlantic, Aug. 2011 (masthead undated, but rendered with images), web page printout.
Heller, 'Sexy' iPad Maps: A Designer's Interactive New York Streetscapes, The Atlantic, Aug. 4, 2011, web page printout. (same article as NPL3 above, fewer images, but with Aug. 4, 2011 date appearing in the masthead).
Villamor et al., Touch Gesture Reference Guide, Apr. 15, 2010.

* cited by examiner

```
                    ┌──────────────────────────────────────────────────┐
              200 ─▶│ Render a view of a first data series including   │
                    │ a first data element having first and second     │
                    │ faces 205                                        │
                    └───────────────────────┬──────────────────────────┘
                                            ▼
                             ┌──────────────────────────────┐
                             │   Receive first input 210    │
                             └───────────────┬──────────────┘
                                             ▼
                    ┌──────────────────────────────────────────────────┐
                    │ Re-render view of first data series to expand    │
                    │ second face of first data element 215            │
                    └───────────────────────┬──────────────────────────┘
                                            ▼
                             ┌──────────────────────────────┐
                             │  Receive second input 220    │
                             └───────────────┬──────────────┘
                                             ▼
                             ┌──────────────────────────────┐
                             │   Fetch data for second      │
                             │   data series 225            │
                             └───────────────┬──────────────┘
                                             ▼
                    ┌──────────────────────────────────────────────────┐
                    │ Modify rendering to show second data series      │
                    │ including a second data element 230              │
                    └───────────────────────┬──────────────────────────┘
                                            ▼
                             ┌──────────────────────────────┐
                             │   Receive third input 235    │
                             └───────────────┬──────────────┘
                                             ▼
                    ┌──────────────────────────────────────────────────┐
                    │ Modify rendering to highlight first data element │
                    │ 240                                              │
                    └───────────────────────┬──────────────────────────┘
                                            ▼
                                    (  Done 245  )
```

FIG. 2

DATA RENDERING ON LOCAL AND REMOTE DISPLAYS

FIELD

The present invention relates generally to charting and correlating large volumes of data, and more particularly to interactively rendering three dimensional (3D) views of such data.

BACKGROUND

Individuals and organizations have the ability to store and access vast quantities of data relating to, e.g., their activities, assets, finances, revenues, costs, net income, and real-time data such as stock market and commodities prices, weather, and news of competitors' activities, political, and other events. Organizing, correlating, and making sense of such vast amounts of stored and real-time data from disparate sources presents a formidable challenge to a user, e.g., a data consumer. A need therefore exists for a simple-to-use technology for interactively selecting and viewing such data.

BRIEF DESCRIPTION OF THE DRAWINGS

The subject matter presented herein is illustrated by way of example, and not by way of limitation, in the figures of the accompanying drawings and in which like reference numerals refer to similar elements and in which:

FIG. 2 is a flowchart depicting a method for rendering 3D data in accordance with one embodiment;

DETAILED DESCRIPTION

Figure 1A:
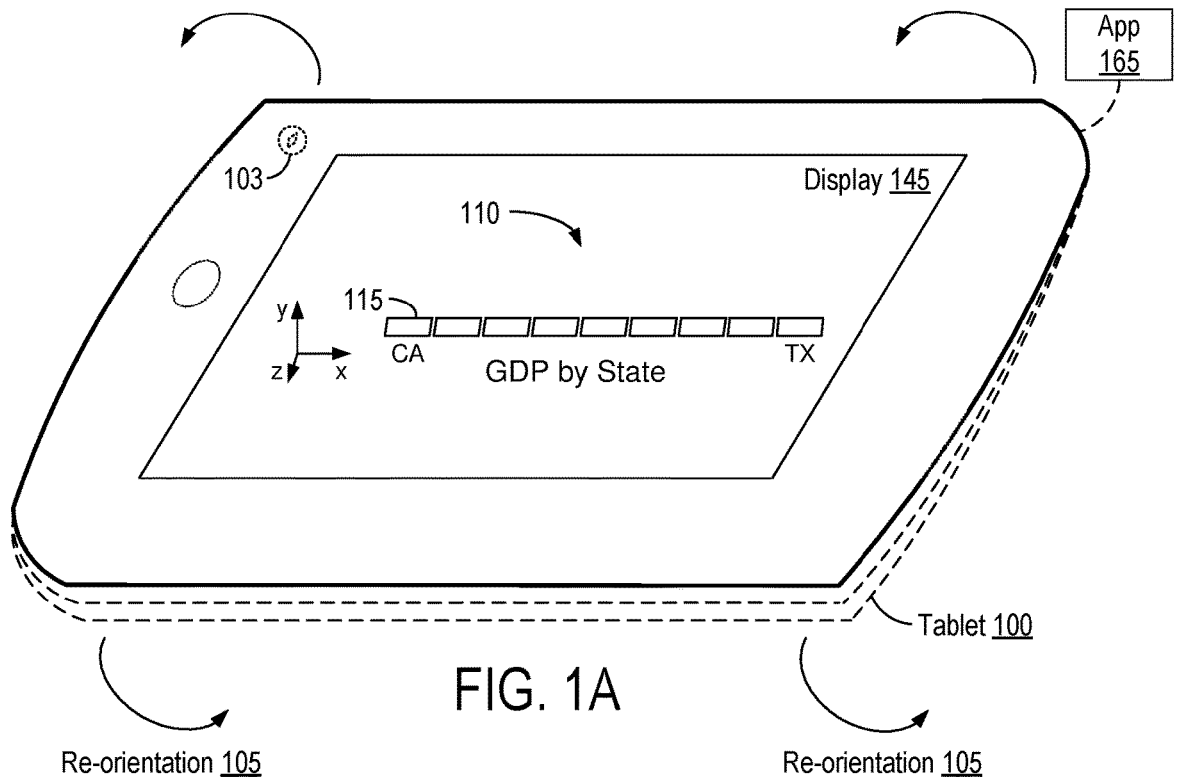
FIGS. 1A-1C depict rendering and displaying a plurality of views of data in 3D in accordance with one embodiment.
Figure 1B:
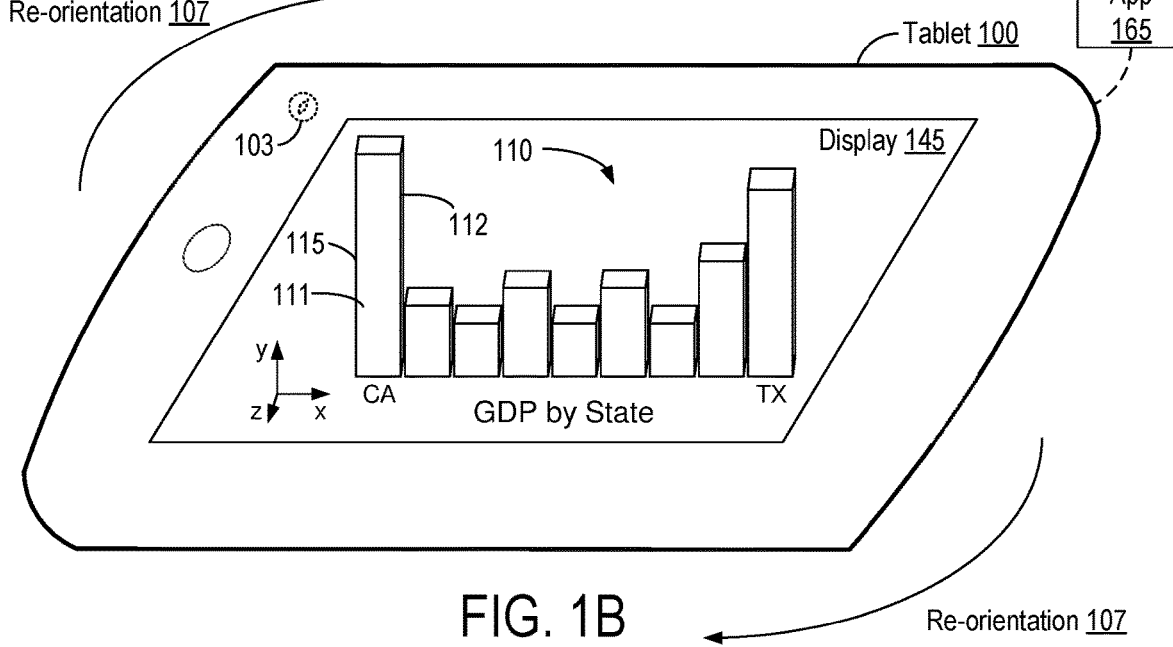
Figure 1C:
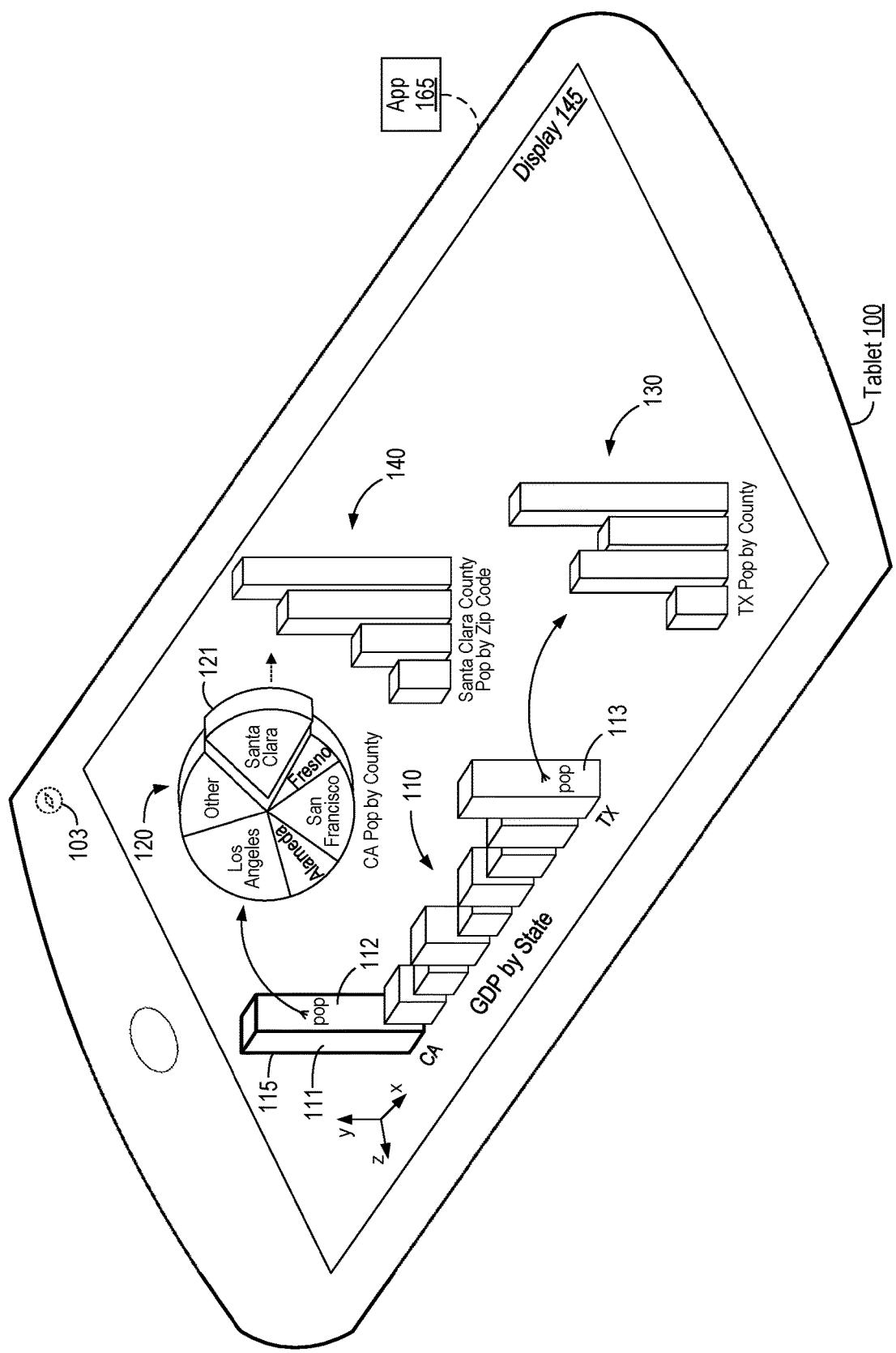

FIGS. 1A-1C depict an Internet-connected multimedia smart tablet 100 displaying 3D views along an x-axis, a y-axis, and a z-axis, of several data series in accordance with one embodiment. One or more orientation sensors 103 enable a user to, e.g., select and view data, modify views and change data selections, and "drill down" simply by re-orienting tablet 100 by, e.g., tilting, rotating, sliding, and rocking it. For example, a user may align data series alongside one another, compare them, spot trends, and identify correlations by intuitively, e.g., "flying over" or "navigating around" the data simply by moving the tablet. The user may thus advantageously glean insights from an arbitrary number of data series in an intuitive and easy-to-use way. The x, y, and z axes appear orthogonal in this example, but could be, e.g., polar.

Data series and view format specifications may also be stored in a self-contained presentation document, e.g., a slide presentation, for future use. Data and one or more format selections relating to the presentation document, e.g., pie, line, or bar chart, are stored in, e.g., local storage, or, e.g., an Internet cloud storage service such as Zoho Docs provided by Zoho Corporation Private Limited. The slide presentation may therefore be advantageously recalled, "navigated," and "explored" as if the stored data were acquired in real time.

Tablet 100, a conventional Internet-enabled multimedia smart tablet, e.g., an iPad available from Apple, Inc. of Cupertino, Calif., is programmed to execute an application 165 that selects data from one or more data sources, e.g., data sources 501 through 509 (FIG. 5), and a data consolidation and conditioning engine 515 (FIG. 5), and renders a view of the data in 3D form for viewing on a display, e.g., LCD display 145. In one embodiment, application 165 responds to input from one or more orientation sensors, e.g., sensor 103 in tablet 100, by re-rendering the 3D view of data. One or more orientation sensors 103 may be placed in arbitrary locations in an internet-enabled media smart tablet or phone, e.g., tablet 100, phone 1200, and phone 1300, as appreciated by those of skill in the art. Application 165 re-draws the rendering on display 145. Inputs from sensor 103 indicate re-orientation of tablet 100, e.g., rotation or inclination. In another embodiment, input may also be provided by sensors not indicating orientation, e.g., a touch sensor, compass, and a photo-sensor for sensing, e.g., a laser pointer.

In another embodiment, tablet 100 transmits ("casts" or "displays") respectively one or more views of data, e.g., in 3D form to one or more remote devices, e.g., a phone 1200, a phone 1300, another tablet 100, an external display (e.g., display 610), and, not shown, a projector. As explained more fully with respect to FIG. 6 below, each respective rendering may include similar, identical, or different data, and may be displayed in a similar, identical, or different format. Moreover, each rendering may be independently "navigated" by, e.g., re-orienting, e.g., smart tablet 100. Other conventional internet-enabled media smart tablets 100 capable of retrieving and rendering data in a 3D format include, e.g., a Galaxy available from Samsung Electronics, Seoul, Korea, and a Nexus available from Google, Inc., of Mountain View, Calif. A conventional internet-connected multimedia smart phone 1200, similar in architecture to tablet 100 and capable of retrieving and rendering data in a 3D format, is an iPhone available from Apple, Inc., of Cupertino, Calif. Phone 1200 is described more fully with respect to FIG. 12 below. Phone 1200 is programmed to execute an application 1265, similar to application 165, in accordance with one embodiment. A conventional mobile phone 1300, capable of retrieving and rendering data in a 3D format in accordance with another embodiment, and is described more fully with respect to FIG. 13 below. Phone 1300 is programmed to execute an application 1365, similar to application 165, in accordance with another embodiment.

Returning to FIGS. 1A-1C, FIG. 1A depicts tablet 100 having display 145, e.g., an LCD display, executing application 165 rendering a view of a first data series 110 including a first data element 115, and displaying the view of first data series 110, representing GDP for several U.S. states as a bar chart. (To produce the rendering, application 165 selected and retrieved U.S. census data from, e.g., data source 506, rendered the view of the first data series, and displayed it on display 145.) In other embodiments, application 165 renders the view of the first data series in a format, e.g., monochrome or color, as a line chart, a pie chart, a bubble chart, or a chart depicting any arbitrary shape(s), e.g., a map including geographic boundaries of U.S. states. For example, first data element 115 and other data elements of first data series 110 depicted as bars in FIG. 1A could have been shaped as U.S. states in another embodiment. For simplicity of illustration, only two states, California (CA) and Texas (TX) are labeled in FIG. 1A. The rendering depicted in FIG. 1A includes a text legend, "GDP by State," below first data series 110 in 3D in a perspective similar to the view of first data series 110. In another embodiment, application 165 renders the text legend as flat text (2D).

The view of first data series 110 depicted in FIG. 1A is "flat," that is, its data elements are visually at zero apparent height. In response to an input, application 165 re-renders ("raises") the view of first data series 110 to appear as depicted in FIG. 1B. The input may be provided by a touch sensor, e.g., from analog package 1225, responsive to, e.g., the user touching display 145. The user simply touches any element of first data series 110 to "raise" its view. In another embodiment, the input may be provided by re-orienting tablet 100, e.g., re-orientation 105, by rotating tablet 100 forward as depicted in FIG. 1A. In one embodiment, the input is provided by orientation sensor 103. In another embodiment, the orientation sensor is an accelerometer. In other embodiments, the orientation sensor may be, e.g., one or more sensors including proximity, gravimeter, gyroscope, photo, and touch sensors.

FIG. 1B depicts a view of a first data series 110, raised by application 165 in response to an input, e.g., touch, or an orientation sensor in one embodiment. The view of first data series 110 depicted in FIG. 1B reveals a first face 111 and a second face 112 of first data element 115. A small portion of the second face 112 is visible. In response to a first input, application 165 modifies the view of first data series 110 to expand the second face 112 of the first data element 115 as depicted in FIG. 1C. The first input may be provided by, e.g., touching or swiping the display. In another embodiment, the first input may be provided by rotating the display, e.g., re-orientation 107 depicted as a clockwise rotation in FIG. 1B. Advantageously, the user may naturally and intuitively view one or more data series, e.g., the view of first data series 110, as though it were a physical object, and rotate tablet 100, e.g., as depicted in FIG. 1B, to examine various aspects of the series. Moreover, the user may "drill down" on various aspects of a data series in another embodiment, to obtain more information, e.g., by viewing one or more additional data series.

FIG. 1C depicts a 3D view of several data series, including the first data series 110, "GDP by State." The first data element 115, corresponding to GDP for California (CA), reveals first and second faces 111 and 112. The second face 112 in the view depicted in FIG. 1C indicates that population information, "pop," is available. In another embodiment, the second face 112 offers other data, e.g., industries, demographics, and weather. In yet another embodiment, the second face 112 offers a menu, allowing the user to select data of interest, and may further offer one or more display formats, e.g., bar, pie, or line charts, or charts including arbitrary shapes. In still another embodiment, a menu for selecting data, and for selecting formats, may be located on one or more displays including one or more remote screens, e.g., display 145, and one or more remote screens, e.g., as depicted FIG. 6, display 610, tablet 100, and phone 1300.

In response to a second input corresponding to the first data element 115, e.g., re-orienting tablet 100, or the user touching first data element 115, application 165 responsively modifies the rendering to include a view of a second data series 120 including a second data element 121. In another embodiment, application 165 automatically highlights first data element 115. In yet another embodiment, application 165 highlights first data element 115 in response to a third input corresponding to first data element 115, e.g., re-orienting tablet 100, or the user touching first data element 115. An emboldened outline of first data element 115 indicates the highlight as depicted in FIG. 1C. In other embodiments, the highlight may be indicated by other visual signals, e.g., cross-hatching, increasing or decreasing color saturation, and changing color. The highlight may also be indicated by spatially separating first data element 115 from the view of first data series 110 in another embodiment, e.g., as depicted by the spatial separation of data element 715 from data series 710 in FIG. 7. More generally, one or more data elements of any data series may be highlighted.

The second data series is labeled "CA Pop by County," and is depicted as a 3D pie chart. (Similarly, application 165 renders a view of a third data series 130 "TX Pop by County" in response to an input corresponding to third data element 113 as depicted in FIG. 1C.) In another embodiment, the view of second data series 120 is depicted as a bubble chart, a bar chart, a line chart, or a chart of any arbitrary shape(s), e.g., a map of political boundaries of California counties. Second data element 121, "Santa Clara," (population for Santa Clara County), may be "drilled down" in another embodiment to provide a view of a fourth data series 140, "Santa Clara County Pop by Zip Code."

In one embodiment, application 165 saves a data series, e.g., selected from data source 506 as described above, and format information, e.g., monochrome, line chart as described above, to, e.g., a document file comprised of one or more logical layers, the one or more logical layers each respectively including a format specification, e.g., bar, pie, or line chart, or a respective data series, e.g., U.S. census, California and Texas state populations. In another embodiment, one or more format specifications and one or more data series may be combined in a single logical layer. In another embodiment, data series and format specifications are respectively stored in individual document files. An application programming interface (API) 520 within data consolidation and conditioning engine 515 (FIG. 5), provides document creation assistance to application 165 in another embodiment. In another embodiment, application 165 includes a user interface through which a user enters data and a format specification to create a presentation, e.g., a slide presentation. In another embodiment, application 165 retrieves the data series and format specifications from the one or more document files rather than from, e.g., exemplary data sources 510 or data consolidation and conditioning engine 515. An arbitrary number of format specifications and data series may therefore be stored and recalled for later use in any "mix and match" combination to create a presentation, e.g., a "static" slide presentation document, that may be recalled at will, rendered as a view of one or more data series in 3D, navigated, and explored as if the stored data series were acquired in real time. As appreciated by one of skill in the art, the one or more document files may be saved to any storage medium, e.g., local storage within tablet 100, a network server accessible via a LAN or WAN, or a cloud storage service such as Zoho Docs provided by Zoho Corporation Private Limited.

FIG. 2 is a flowchart illustrating a computer-implemented method 200 for presenting data in accordance with one embodiment. The method executes on an internet-enabled multimedia device, e.g., tablet 100, phone 1200, and phone 1300. In step 205, the method renders a view of a first data series, the first data series including a first data element, the view including an x-axis and a y-axis. The view of the first data series reveals first and second faces of the first data element. In response to a first input (step 210), the method at step 215 modifies the view of the first data series to expand the second face of the first element. In response to a second input (step 220) corresponding to the first data element, the method at step 225 fetches data, and at step 230, modifies the rendering to include a view of a second data series including a second data element. As with the first data series, the view of the second data series may be rendered as, e.g., one or more of a line, bar, stacked bar, balloon chart, and a chart depicting any arbitrary shape(s). Responsive to a third input (step 235), the method at step 240 highlights the first data element. Highlighting a data element includes, e.g., emboldening its outline, spatially separating it from its data series, and applying, removing, or changing color. More generally, one or more data elements of any data series may be highlighted in another embodiment. Inputs, e.g., first, second, and third, may be received from one or more sensors, e.g., touch, orientation (e.g., accelerometer), and photo-sensor. At step 245, the method is done.

Figure 3A:
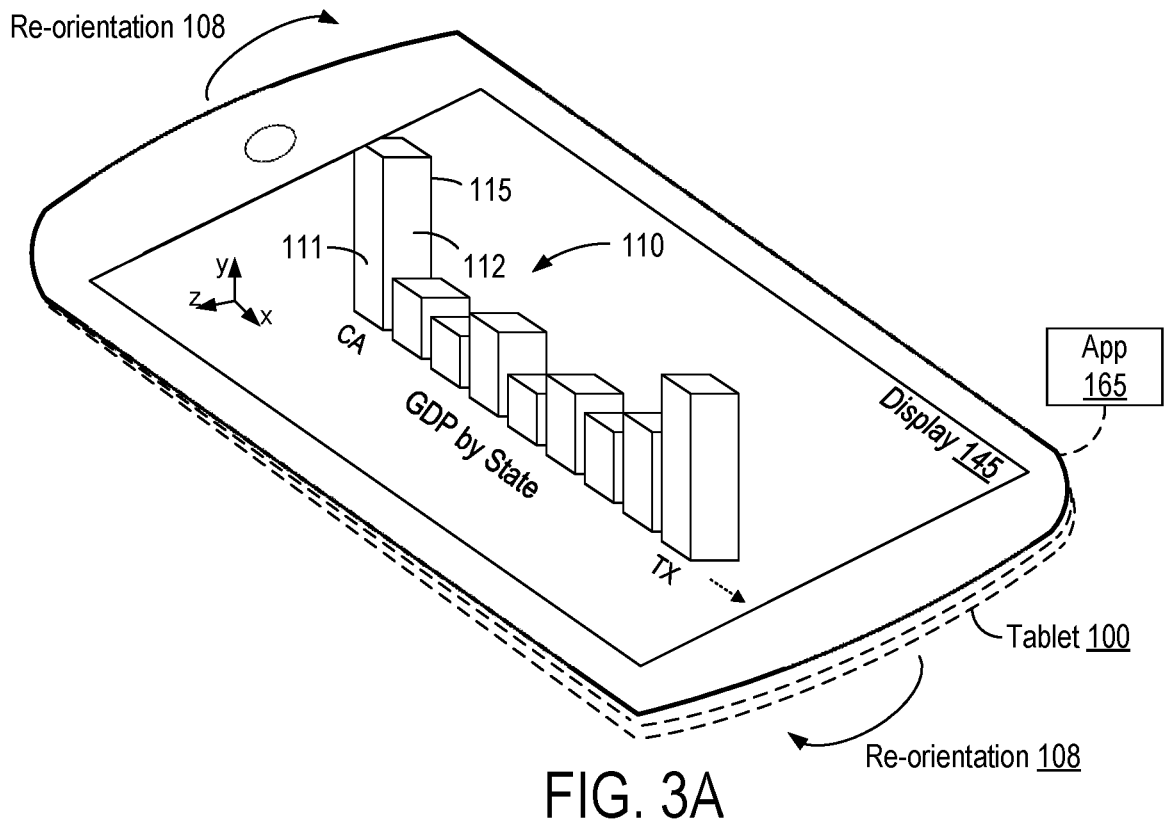
FIGS. 3A-3B depict selection of data for a data series in accordance with one embodiment.
Figure 3B:
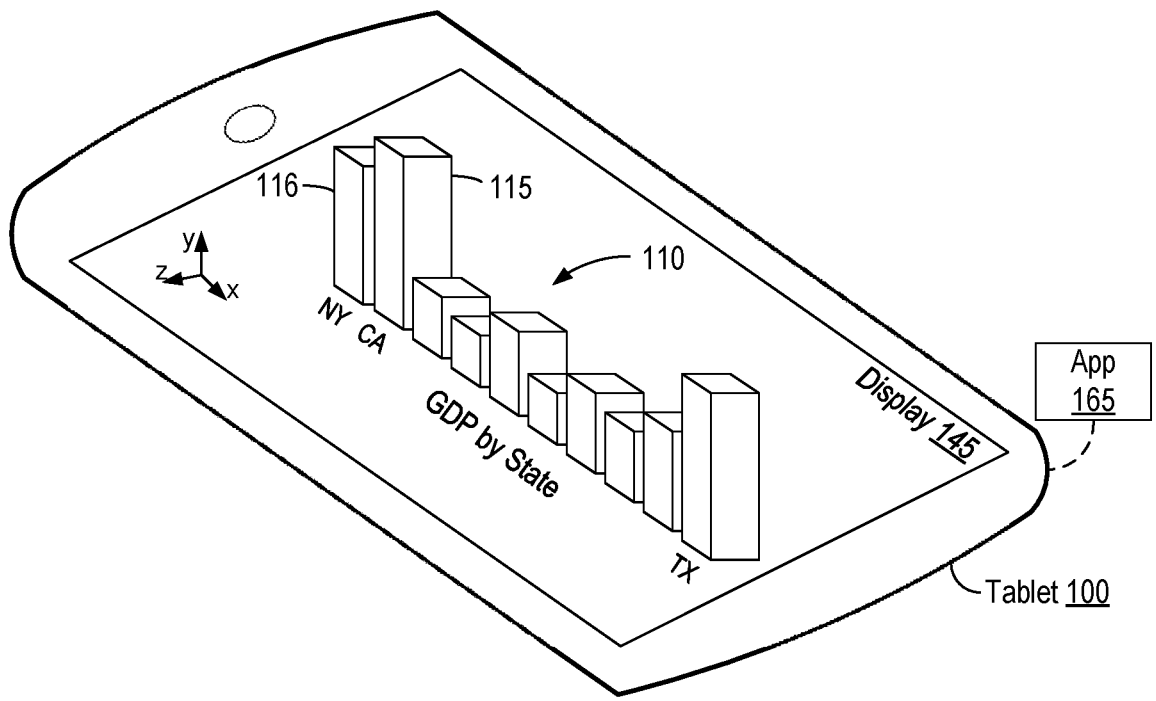

FIGS. 3A and 3B depict selection of data for a data series in accordance with one embodiment. FIG. 3A depicts a rendering of a view of a first data series 110 in 3D, the first data series including a first data element 115. In response to a first input, e.g., touching or swiping display 145, or re-orienting tablet 100 by, e.g., tilting it as depicted by re-orientation 108 in FIG. 3A, application 165 re-renders the view of first data series 110 by, e.g., sliding it in the direction of the tilt, e.g., downward and to the right as depicted by the dashed arrow in FIG. 3A. In one embodiment, the first input is provided by an orientation sensor. In other embodiments, the orientation sensor may be, e.g., one or more sensors including magnetometers, gravimeters, gyroscopes, and proximity, photo, and touch sensors. The effect of manipulating tablet 100 is natural and intuitive to the user. In the example of FIG. 3A, the view of first data series 110 slides in response to re-orientating, e.g., tilting, the tablet, as if the data series were pulled by gravity. In another embodiment, application 165 selects and retrieves additional data from one or more data sources, e.g., data engine 515 and data sources 501 through 509, and re-renders the view of first data series 110 to comprise a second data element 116 (labeled "NY") as depicted in FIG. 3B. Additional data elements may be selected and viewed in a similar way. By maneuvering tablet 100, the user may thus advantageously navigate through data using simple and intuitive motion. Application 165, in response, selects and retrieves data, and re-renders views of data, e.g., data series 110 as depicted in FIGS. 3A-3B. Application 165 thus selects and retrieves data responsive to an input, including input from, e.g., an orientation sensor.

Figure 4:
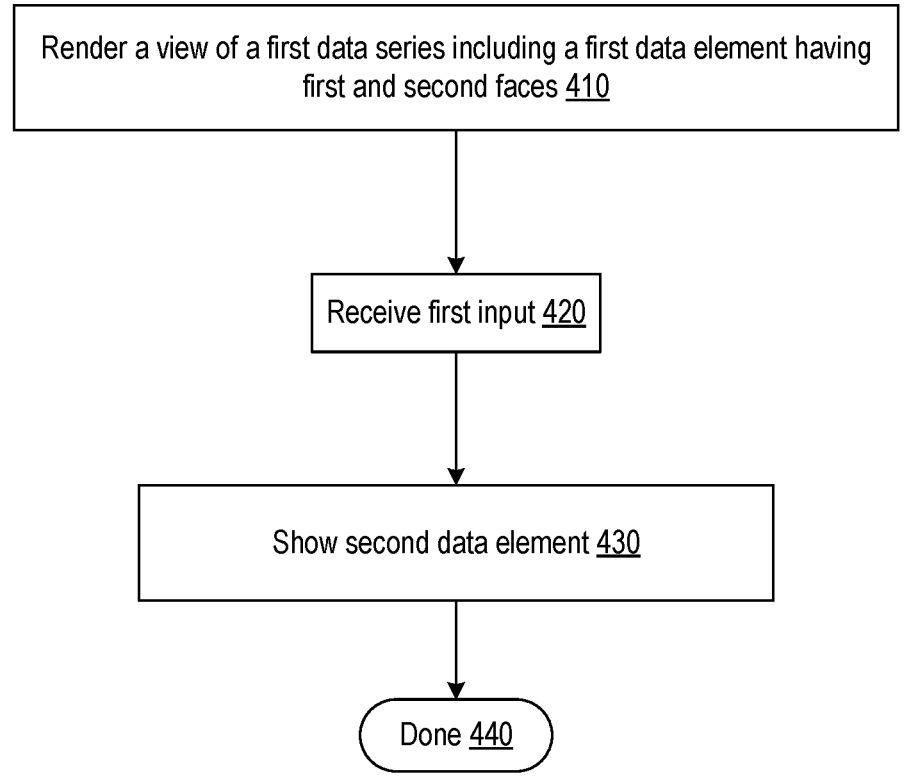
FIG. 4 is a flowchart depicting a method for selecting data and rendering 3D data in accordance with one embodiment.

FIG. 4 is a flowchart illustrating a computer-implemented method 400 for selecting data in response to an input and presenting data in accordance with one embodiment. The method executes on an internet-enabled multimedia device, e.g., tablet 100, phone 1200, and phone 1300. In step 410, the method renders a view of a first data series including a first data element, the view of the series including an x-axis and a y-axis. The first data series reveals first and second faces of the first data element. In response to a first input (step 420), the method at step 430 modifies the view of the first data series to render a second data element. The first input may be received from one or more sensors, e.g., touch, orientation (e.g., accelerometer), and photo-sensor. The method selects and retrieves data in response to receiving the first input in another embodiment. At step 440, the method is done.

Figure 5:
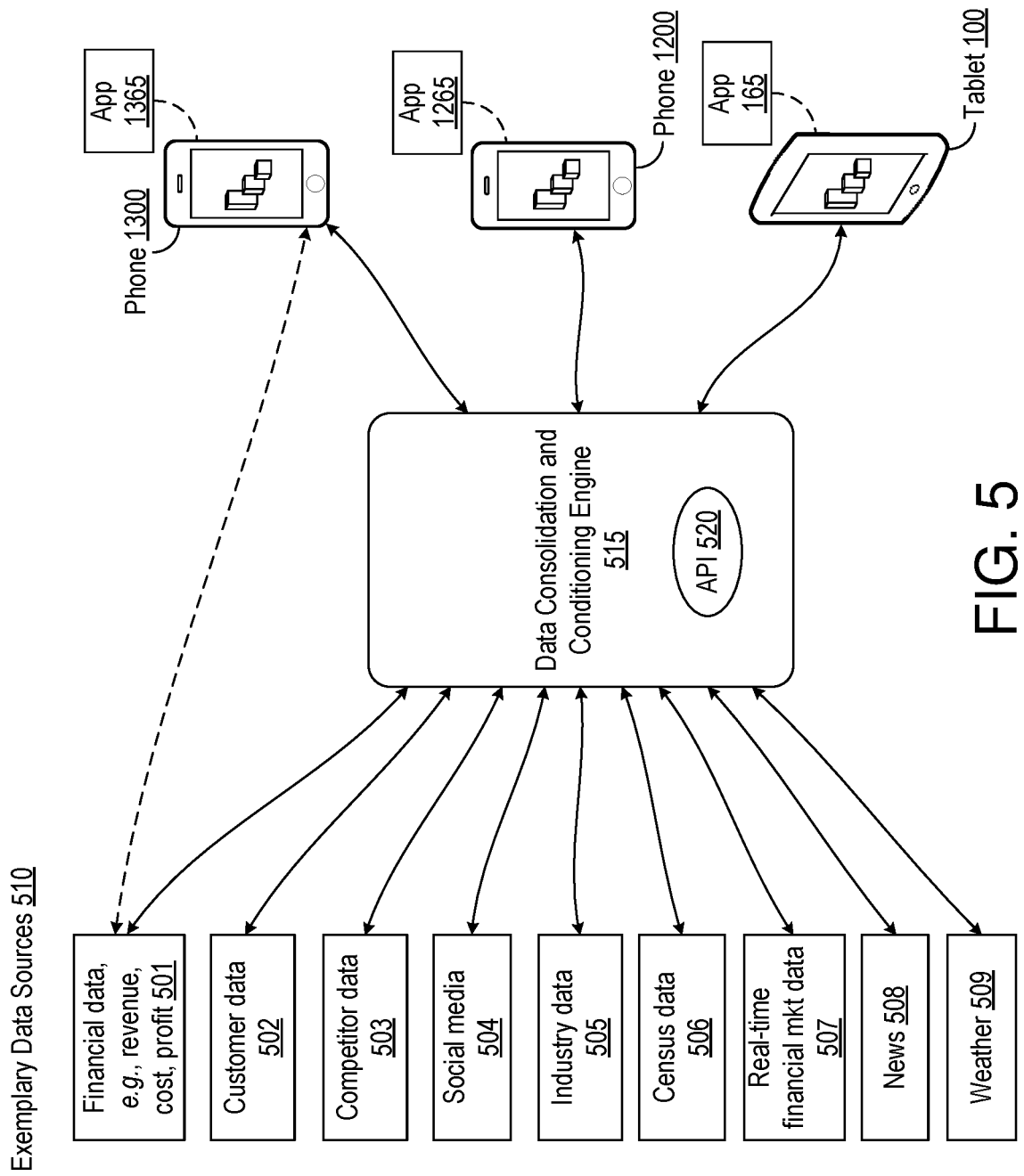
FIG. 5 is a diagram depicting rendering and displaying 3D views of data in accordance with one embodiment.

FIG. 5 depicts phone 1300 executing application 1365, which includes selecting and displaying data in 3D from one or more data sources in accordance with one embodiment. FIG. 5 also depicts phone 1200 and tablet 100 respectively executing applications 265 and 165, which respectively include selecting and displaying data from one or more data sources in accordance with additional embodiments. For simplicity of discussion and illustration, and without limitation, the following description is with respect to phone 1200 executing application 1265.

A set of exemplary data sources 510, including data sources 501 through 509, may include data from a database, a live data feed, and disparate data repositories. Data sources 501 through 509 are identified for illustrative purposes only and are not intended to be limiting. A skilled artisan will readily appreciate that a user may select any data source of interest. In one embodiment, exemplary data sources 510 include financial data 501 relating to an organization, e.g., its revenues, profit and loss, and cash flow, data 502 including, e.g., revenues by customer, pending customer inquiries, service and support issues, data 503 relating to competitors, e.g., features and price points of competitive products, dates of past and future competitor product releases, marketing events, and advertising campaigns, data 504 relating to social media, e.g., blogs, reviews and comments relating to an organization and its products by customers, third parties, and the public at large, including "street" prices of an organization's and its competitor's products, industry data 505, e.g., market share by competitors, growth trends, trends, and events in related industries, census data 506, e.g., U.S. decennial census data, and census data of other countries, real-time market data 507, e.g., common stock prices including listings relating to an organization, its competitors, commodities, and futures, news 508, e.g., Bloomberg, Reuters, and CNN International, and weather data 509, e.g., real-time and forecast events provided by, e.g., the U.S. National Weather Service ("NWS"), and the U.S. Geological Survey ("USGS"). These and other data sources, individually or in combination, may be of interest to a user wishing to, e.g., interactively visualize, interrelate, and correlate, historical and real-time data, and to "drill-down" on items of interest.

Owing to the potentially disparate nature of a plurality of diverse data sources, a data consolidation and conditioning engine 515 ("engine 515") may be interposed between data sources 501 through 509 and, e.g., tablet 100, phone 1200, and phone 1300 as depicted in FIG. 5. Engine 515 may consolidate data by, e.g., directly storing data, or by storing information to assist it to retrieve data from a respective data provider, e.g., Bloomberg. Engine 515 may ease the burden of data selection and receipt by application 1265 by providing a "go-to" data source location that performs on-demand look-ups for application 1265 in response to inputs it receives on phone 1200. Engine 515 may also condition data by, e.g., converting quarterly financial data for an organization and its competitors to calendar dates for rendering on a common time axis.

In one embodiment, application 1265 selects and receives data directly from one or more data sources, e.g., 501 through 509, while in another embodiment, application 1265 selects and retrieves data through engine 515. In yet another embodiment, application 1265 selects and receives data from engine 515 and, e.g., one or more data sources, e.g., 501 through 509. In yet another embodiment, application 165 selects and receives data from data source 501 (dashed line between data source 501 and phone 1300 in FIG. 5) and engine 515.

Figure 6:
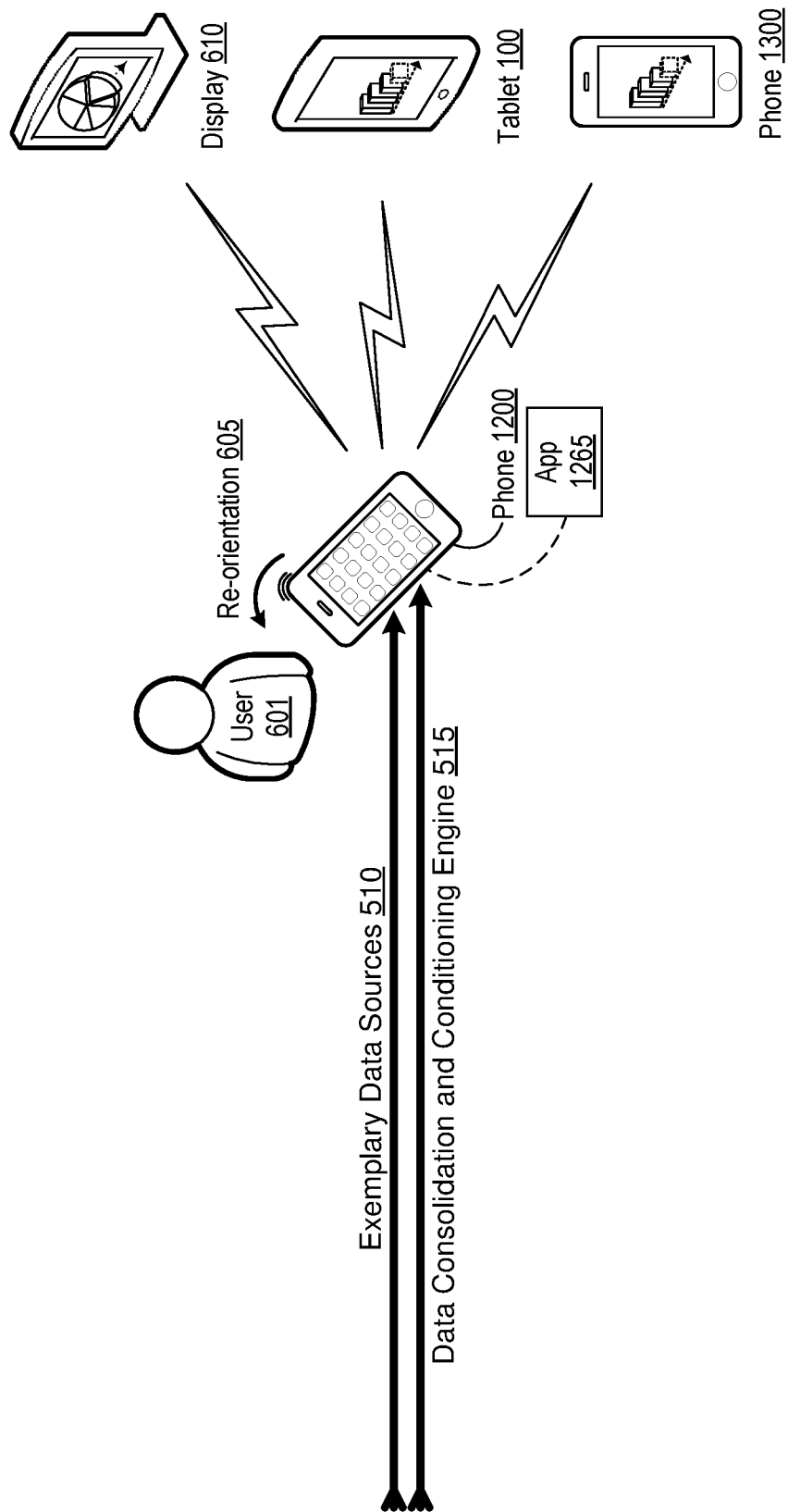
FIG. 6 is a diagram depicting rendering and casting 3D views of data in accordance with one embodiment.

FIG. 6 depicts phone 1200 receiving data from engine 515 and one or more data sources 501 through 509, and displaying ("casting") renderings of views of data in 3D on one or more remote screens, e.g., display 610, tablet 100, and phone 1300. In another embodiment, phone 1200 displays renderings on its own display 1245 in addition to displaying renderings on one or more remote screens. Displaying ("casting") a rendering on a remote screen may be done wirelessly, e.g., by Wi-Fi, Bluetooth, or via cable, e.g., HDMI. Phone 1200 is depicted casting to remote screens in this example for simplicity of illustration only, without limitation. In other embodiments, tablet 100, phone 1300, or any other internet-connected multimedia smart device may cast renderings to a remote screen. In one embodiment, application 1265 respectively renders one or more views of data, and casts the respective renderings to one or more remote screens, e.g., display 610, tablet 100, phone 1300, and another phone 1200. Each rendering may include similar, identical, or different data, and may be displayed in a similar, identical, or different format. For example, FIG. 6 depicts application 1265 casting a rendering of a view of data, e.g., Santa Clara County population, formatted as a pie chart to display 610, e.g., California population data, formatted as a bar chart to tablet 100, and, e.g., Texas population data formatted as a bar chart to phone 1300. In one embodiment, phone 1200 receives one or more inputs from one or more sensors, e.g., touch, photo-sensor, orientation sensor (e.g., an accelerometer responsive to a device re-orientation, e.g., re-orientation 605), enabling the user to independently "navigate" around each 3D rendering, advantageously allowing the user to explore each view of data. For example, in response to re-orientation 605, application 1265 highlights a segment of a 3D view of a pie chart, depicted as spatially separating (sliding toward the right) on display 610 of FIG. 6.

In a further example (not depicted), application 1265 renders and casts one or more views of data in 3D to one or more remote screens corresponding to an architectural model, e.g., a building. For example, a rendering of a first view of data for a first floor of the building is cast to, e.g., display 610, a rendering of a second view of data for a second floor is cast to, e.g., tablet 100, and a rendering of an exterior perspective view of the building is cast to, e.g., phone 1300. Phone 1200 may re-oriented to independently "navigate" around each of the first, second, and third views to explore areas of interest, and to select one or more items of interest within each view for further detail, e.g., to "drill down." In yet another embodiment, application 1265 renders views of data in a format and sequence different from a rendering it might produce for its own display 245, tailoring the rendering to a remote screen, e.g., display 610, tablet 100, phone 1300, or another phone 1200. Accordingly, "casting" or displaying a rendering on a remote screen is not limited to displaying or casting a replica of a rendering, and is not limited to a single format or a single rendering of a view of data.

Phone 1200 controls the views of data cast to one or more screens in one embodiment. For example, user 601 has configured phone 1200 to cast renderings of views of data to display 610, tablet 100, and phone 1300 for a presentation. During a presentation, user 601 performs a re-orientation 605 of phone 1200. In response, application 1265, similar in operation to application 165 described with respect to FIGS. 1A-1C and 3A-3B, performs data selection and retrieval from one or more data sources, re-renders views of data series to include new data elements, and casts those views to remote screens, e.g., display 610, tablet 100, and phone 1300.

Figure 7:
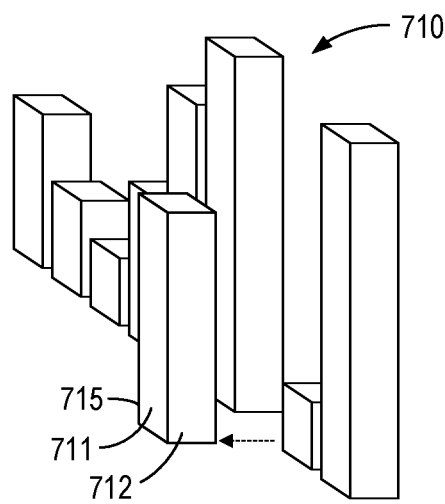
FIGS. 7-10 depict 3D views of various data series in accordance with one or more embodiments.
Figure 8:
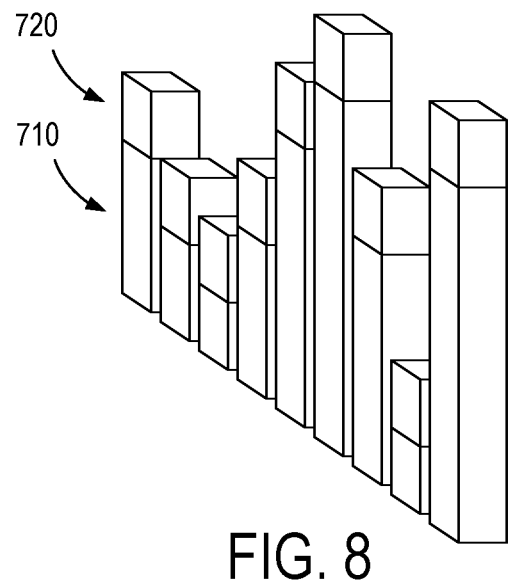
Figure 9:
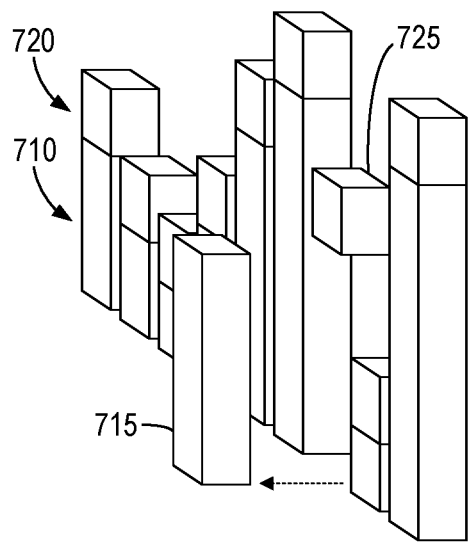
Figure 10:
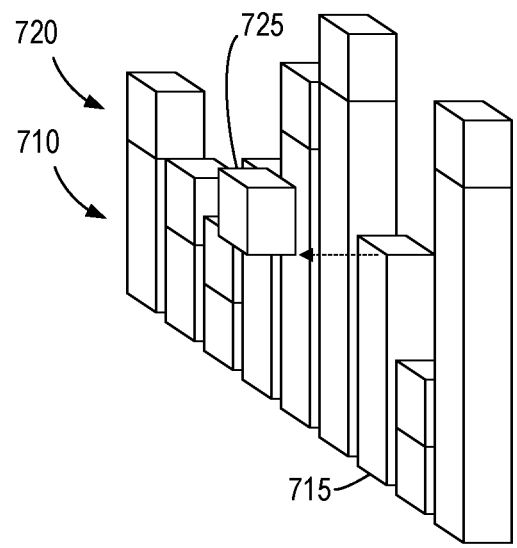

FIGS. 7-10 depict additional examples of renderings of views of data series and data elements. FIG. 7 depicts a rendering of a view of a data series 710 including first data element 715, shown "highlighted" by spatial separation from data series 710. Element 715 includes first and second faces 711 and 712. As explained above, an application executing on an internet-enabled smart phone or tablet, e.g., tablet 100, phone 1200, and phone 1300 respectively executing applications, e.g., 165, 1265, and 1365, may select additional data corresponding to first and second faces 711 and 712 in response to an input, e.g., touch, swipe, and orientation, re-render the view of data series 710, and render a view of a second data series 720, shown, e.g., as a stacked bar chart atop data series 710 in FIG. 8. In another embodiment, the view of second data series 720 is rendered as, e.g., a pie, line, bar, balloon chart, or a chart depicting any arbitrary shape(s). FIG. 9 depicts first data element 715 shown highlighted by spatial separation from first and second data series 710 and 720. Similarly, FIG. 10 depicts second data element 725 highlighted by spatial separation.

Figure 11:
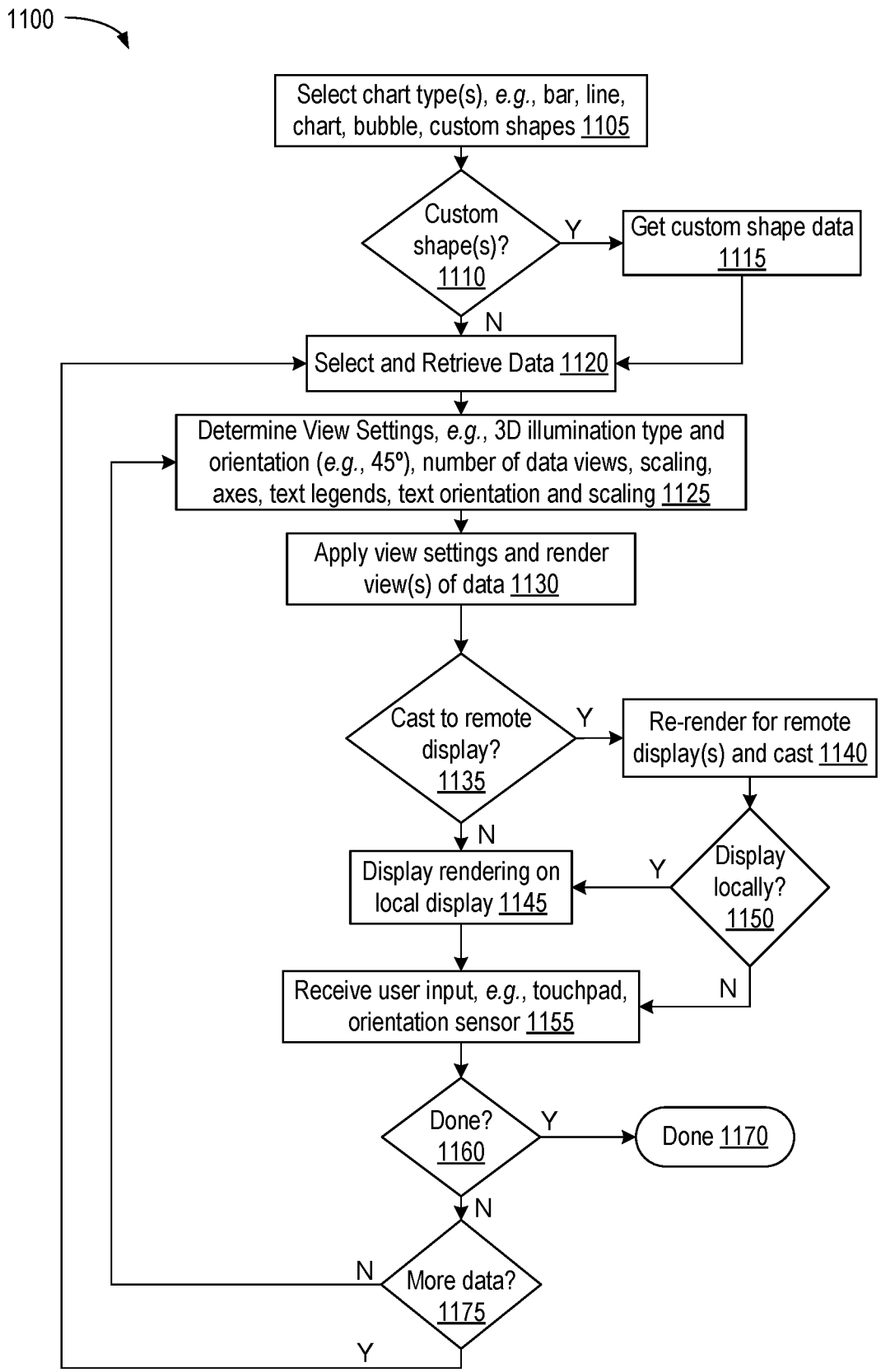
FIG. 11 is a flow chart depicting a method for rendering 3D data in accordance with one embodiment.

In another aspect, FIG. 11 depicts a flowchart illustrating a method 1100 in accordance with one embodiment for rendering 3D views of data. The method executes on an internet-enabled multimedia device ("device"), e.g., tablet 100, phone 1200, and phone 1300. A chart type, e.g., bar, line, pie, balloon, custom, is selected in step 1105. The chart type determines how a given set of data will be formatted for rendering and display. The method tests, at step 1100, whether one or more custom shapes e.g., geographic boundaries of U.S. states, is selected. If so, the method gets custom shape data (step 1115). The shape data may be retrieved from a data source, e.g., engine 515, or a database. Data to be rendered into views of data series is selected and retrieved at step 1120. Data may be retrieved from one or more data sources, e.g., engine 515 and data sources 501 through 509. The method determines view settings reflecting any selected chart types(s), and the selected data sources. Parameters relating to rendering, e.g., a 3D illumination source, its angle, color, intensity, orientation, e.g., 45°, number of data views, scaling, text legends, fonts and related attributes, are determined in step 1125. In step 1130, the method applies the parameters determined in step 1125, and renders views of one or more data series.

The method determines, at step 1135, whether to cast (display) the rendering to one or more remote displays, e.g., tablet 100, iPhone 1200, phone 1300, and display 610. In step 1140, the method re-renders the views of data series to create rendering(s) appropriate to one or more remote displays, and casts (displays) the rendering(s) to the remote displays. In one embodiment, the method has built-in knowledge of parameters relating to remote displays, to assist in determining whether and how to re-render views of data. In another embodiment, the method may retrieve remote screen parameters from, e.g., engine 515, or a database. The method determines, at step 1150, whether the rendering is to be displayed on the device and if so, displays the rendering in step 1145. The method may provide an input for a user of the device to force a determination in real-time in one embodiment.

In step 1155, the method receives an input from one of a number of sources including, e.g., a touch sensor, and an orientation sensor indicating that a user is moving (or has moved) the device by, e.g., rotating, shaking, rocking, or tilting it. One input may be a simple request to exit the method (step 1160), in which case the method exits at step 1170. In one embodiment, a user may exit the application at any step by, e.g., touching an "exit" icon on, e.g., display 245. At step 1175, the method determines whether input received at step 1155 includes a request for more data. For example, a user tilting the device to expose a second face of a data element and selecting data relating to the second face, would signal the method to retrieve more data, in one embodiment. A user navigating a data series by, e.g., tilting, shaking, rocking, or rotating the device, would signal a need for more data in another embodiment. The method moves to step 1120, selects and retrieves data, determines new view settings relating to the data, and determines new view settings responsive to orientation inputs it may have received in step 1155. If at step 1175 the method determines that more data is not needed, it moves to step 1125.

Figure 12:
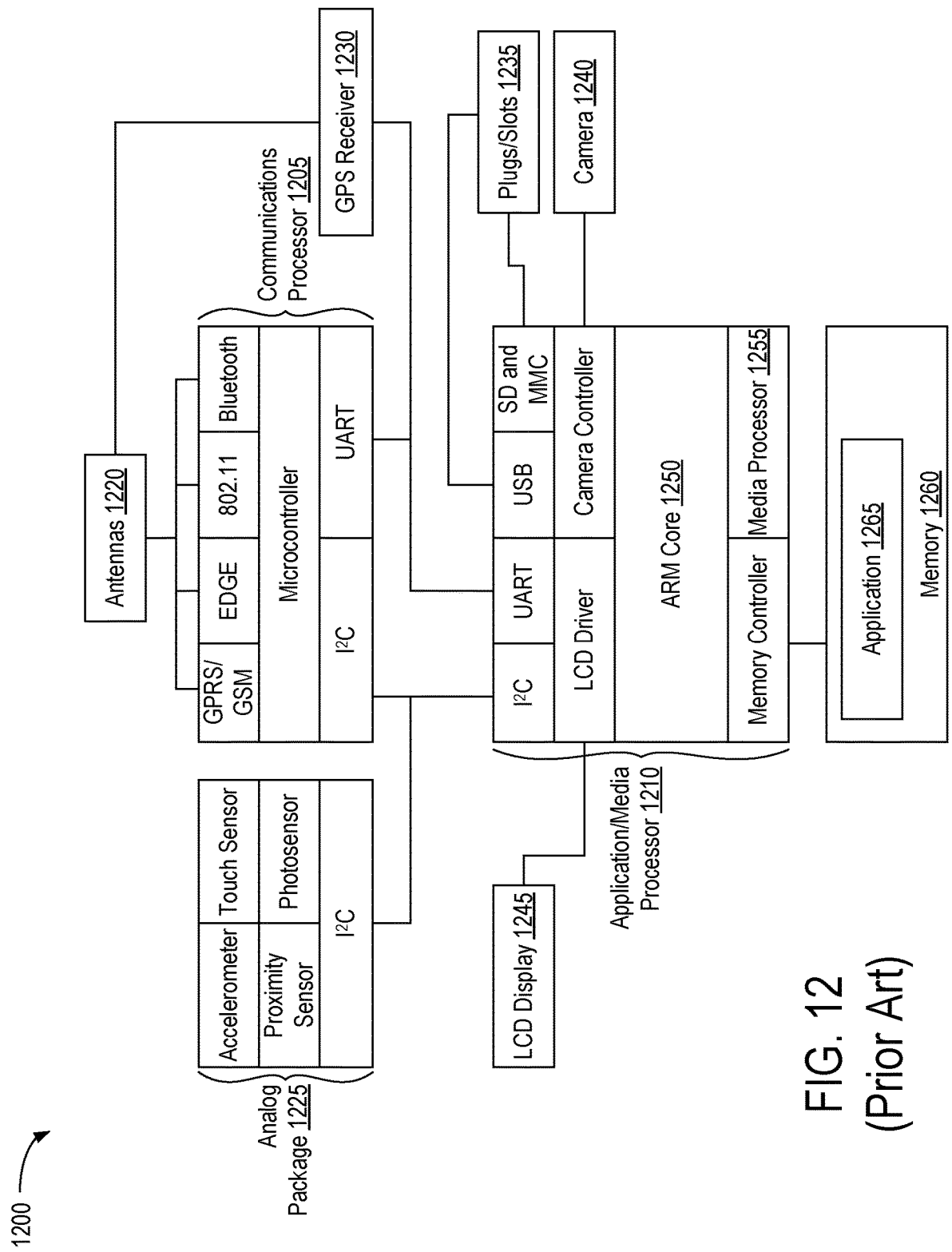
FIG. 12 is a block diagram of an iPhone (phone 1200), an Internet-connected multimedia smart phone available from Apple Inc. of Cupertino, Calif., in accordance with one embodiment.

FIG. 12 is a block diagram of a conventional iPhone (phone 1200), an Internet-connected multimedia smart phone available from Apple, Inc. of Cupertino, Calif. Phone 1200 may be adapted to select data, render views of data, and to change views of data, in response to a change in orientation in accordance with one embodiment with little or no hardware modifications. In one embodiment, for example, an iPhone can be configured to simultaneously display several data sources in a 3D view, e.g., a line, bar, pie, balloon, or custom chart, and in response to a change in orientation of the iPhone, retrieve additional data, e.g., from local and real-time sources, adjust data scaling and rendering angles, and re-render the 3D view. In another embodiment, the iPhone casts views of data to a remote display device, e.g., another iPhone, a tablet device, or a projector. Phone 1200 is one of many readily available platforms (e.g., tablet 100, and phone 1300) easily adapted to retrieve data and interactively render 3D charts. Phone 1200 and its constituent components are well understood by those of skill in the art. A brief description of the phone systems and subsystems is provided for context.

Phone 1200 includes two processors, a communications processor 1205 and an application/media processor 1210 that are interconnected by a pair of serial interfaces I²C (for Inter-Integrated Circuit) and UART (for Universal Asynchronous Receiver/Transmitter). Communications processor 1205, sometimes called a baseband processor, supports widely used wireless communication protocols, GPRS/GSM, EDGE, 802.11, and Bluetooth, and is coupled to a respective set of antennas 1220 for this purpose. The GPRS/GSM block, part of the cellular front end, can be adapted to support different cellular communication standards in other embodiments. Phones in accordance with still other embodiments communicate via networks other than cellular networks, in which case the function of the cellular front end is provided by a different form of wireless network interface.

Processor 1210 is at the heart of the phone, and includes support for a number of input/output devices in addition to what is provided by the communications processor. An analog package 1225 includes orientation sensors, e.g., an accelerometer, a touch sensor, a proximity sensor, and a photo-sensor. The accelerometer allows the application processor to sense changes in phone orientation, the touch sensor supports the user interface, the proximity sensor senses, e.g., that the phone is near or far from the user's cheek or the difference between a cheek and a fingertip, and the photo-sensor provides a measure of ambient light for, e.g., adjusting display backlighting. Other useful input comes from a GPS receiver 1230, plugs/slots 1235 that support memory cards and a USB port, and a camera 1240. Other sensors, such as a microphone, are not shown. User output is provided by an LCD display 245 and, though not shown, a speaker, headphone jack, and a motor supporting a vibrating alert.

Processor 1210 includes two sub-processors, a general purpose ARM (Advanced RISC Machine) core 1250 and a media processor 1255 dedicated to the efficient processing of audio and video data. A memory device or module (multiple memory die) 1260 stores instructions and data for processor 1210. Memory 1260 is implemented using, e.g., synchronous dynamic random access memory (SDRAM). Phone 1200 is programmed, in accordance with one embodiment, to execute an application 1265, similar to application 165 described above with respect to tablet 100.

Figure 13:
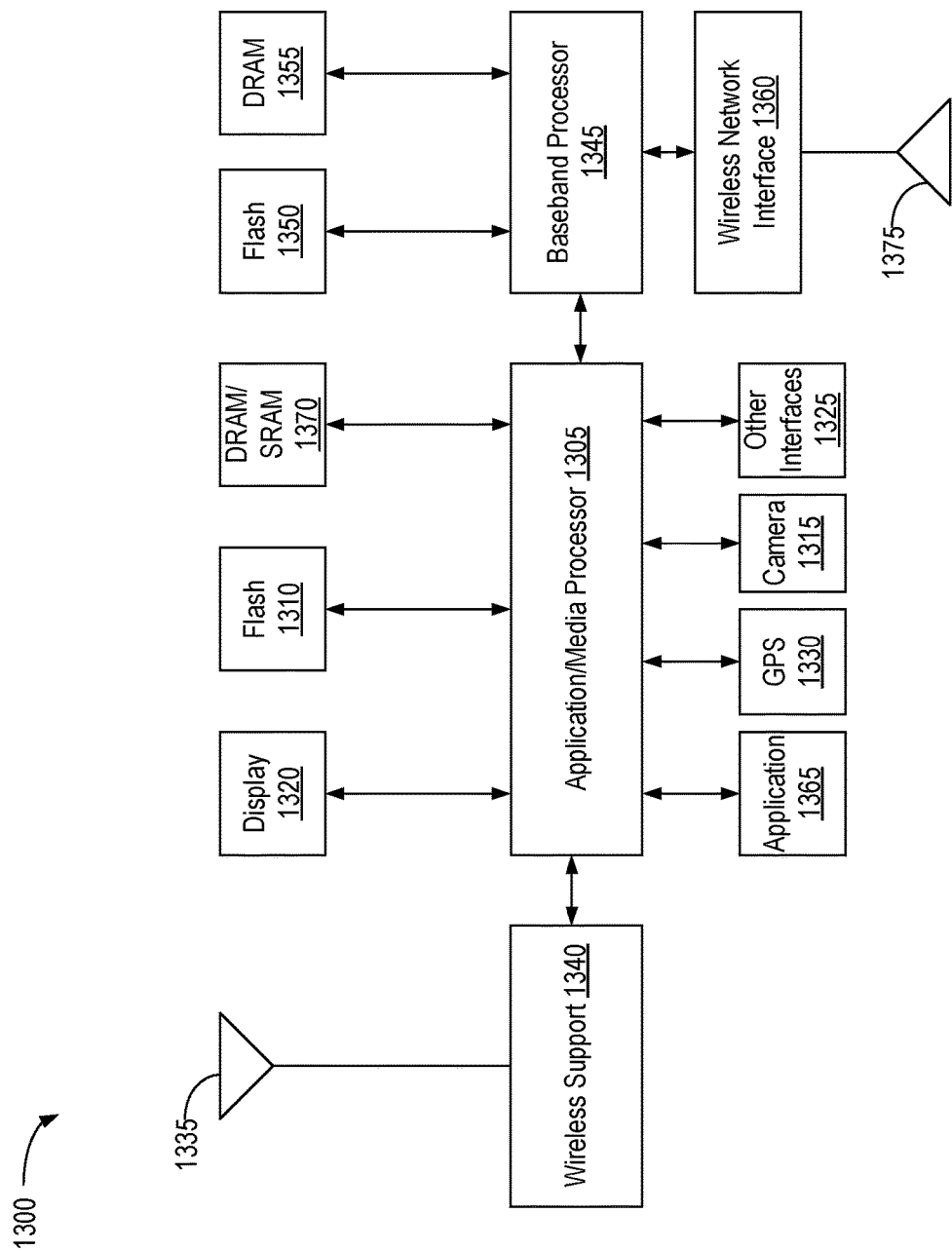
FIG. 13 is a block diagram of a mobile phone 1300 in accordance with one embodiment.

FIG. 13 is a block diagram of a conventional mobile phone 1300 capable of retrieving and rendering data in a 3D format in accordance with one embodiment. Phone 1300 is a "smart phone" portable device in that it supports a range of features beyond simply cellular or satellite communication (e.g., web access, location-based services, multimedia applications etc.). An application/media processor 1305 at the heart of phone 1300 is typically a single integrated circuit that processes and manages programs stored in a flash memory 1310. Such programs might support, for example, Internet access, e-mail and text messaging, and the display and sharing of still and moving images. Processor 1305 supports various user interfaces, including a camera 1315 and display 1320. Other interfaces 1325 include, e.g., a microphone, microphone jack, an infrared port, a Bluetooth wireless port, and a Wi-Fi wireless network connection. Phone 1300 may also include a Global Positioning System ("GPS") receiver 1330.

Phone 1300 includes one or more antennas 1335 that are coupled to processor 1305 via a respective interface or interfaces 1340 in support of, e.g., Wi-Fi, Bluetooth, and GPS functionality. Phone 1300 additionally includes a conventional baseband processor 1345, supported by flash and DRAM memories 1350 and 1355 that execute instructions in support of communication with cell networks via a wireless network interface 1360 and antenna 1375. Network interface 1360 is a cellular front end in this embodiment, and is adapted to communicate with a cellular network via antenna 1375. Phone 1300 is programmed, in accordance with one embodiment, to execute an application 1365, similar to application 165 described above with respect to tablet 100.

In the foregoing description and in the accompanying drawings, specific terminology and drawing symbols are set forth to provide a thorough understanding of the present invention. In some instances, the terminology and symbols may imply specific details that are not required to practice the invention. For example, the phones discussed above are "smart phones" that support many services in addition to standard voice functions. Portable computing devices other than smart phones, such as tablet computers, e.g., an iPad manufactured by Apple, Inc. of Cupertino, Calif., and palmtop and lap-top computers, can be equipped as detailed herein to interactively render 3D data charts. While the present invention has been described in connection with specific embodiments, variations of these embodiments will be obvious to those of ordinary skill in the art. Moreover, some components are shown directly connected to one another while others are shown connected via intermediate components, or wirelessly, e.g., Wi-Fi or Bluetooth. In each instance, the method of interconnection establishes some desired electrical communication between two or more devices, as will be understood by those of skill in the art. Therefore, the spirit and scope of the appended claims should not be limited to the foregoing description. In U.S. applications, only those claims specifically reciting "means for" or "step for" should be construed in the manner required under 35 U.S.C. § 112(f).

What is claimed is:

1. A computer-implemented method for presenting data visually on a local display and at least one remote display, the method comprising:
   rendering in a first display format a first view of a first data series that is retrieved from a first data source, the first data series including first data elements for the local display, the first view presenting the first data series in a first display format and including a menu for each of the first data elements, each menu allowing a user to select a second data series related to the corresponding first data element and a second display format for the second data series; and
   responsive to a first input selecting the second data series and the second display format for the second data series, retrieving the second data series from a second data source that is located remotely from the first data source, wherein the second data source includes real-time data, rendering a second view of the selected second data series and displaying the second view on the local display in the second display format, discontiguous from the first view, wherein the second data series was not previously shown on the local display
   casting the second view to one of the at least one remote display, including displaying the second data series on the remote display in a third display format that is different than the second display format; and
   controlling the second view on the remote display by inputs to the local display.

2. The method of claim 1, further comprising:
   selecting another of the second data series, responsive to a second input;
   rendering a third view of the selected other of the second data series; and
   casting the third view to a second of the at least one remote display.

3. The method of claim 1, the first view depicting the first data elements extending along an axis.

4. The method of claim 1, the first view depicting the one of the first data elements as having:
   a first face; and
   a second face offering the menu.

5. The method of claim 4, wherein the second face appears orthogonal to the first face.

6. The method of claim 4, further comprising modifying the first view, responsive to a second input, to expand the second face.

7. The method of claim 1, further comprising navigating the second view responsive to a second input to the local display.

8. The method of claim 1, further comprising sensing a re-orienting of the local display and altering the second view responsive to the sensed re-orienting.

9. The method of claim 1, further comprising, responsive to a second input, casting a third view of the second data series to a second display of the at least one remote display.

10. The method of claim 9, further comprising rendering the third view of the second data for the second display.

11. The method of claim 1, further comprising, tailoring the rendering of the second view for the one of the at least one remote display.

12. The method of claim 1, further comprising, responsive to a second input altering the second view to include a rendering of a third data element corresponding to the second data series.

13. The method of claim 12, wherein at least one of the first input and the second input comprises movement of the local display.

14. A computer-implemented method for presenting data visually on a local display and at least one remote display, the method comprising:
   rendering in a first display format a first view of a first data series that is retrieved from a first data source, the first data series including first data elements for the local display, the first view presenting the first data series in a first display format and including a menu for each of the first data elements, each menu allowing a user to select a second data series related to the corresponding first data element and a second display format for the second data series;
   responsive to a first input selecting the second data series and the second display format for the second data series, retrieving the second data series from a second data source that is located remotely from the first data source, wherein the second data source includes real-time data, displaying a second view of the selected second data series on the local display in the second display format, discontiguous from the first view, wherein the second data series was not previously shown on the local display;
   responsive to a second input that includes touching or swiping the first display, transmitting a third view to the at least one remote display, including presenting the second data series on the remote display in a third display format that is different than the second display format; and
   controlling the third view by inputs to the local display.

15. The method of claim 14, wherein the third view comprises the second data series.

16. The method of claim 14, further comprising retrieving the data from at least one of a network server or a cloud storage service remote from the local display.

17. The method of claim 16, wherein transmitting the third view to the at least one remote display comprises communicating with the remote display via an Internet connection.

18. The method of claim 14, further comprising rendering the third view for the at least one remote display.

19. The method of claim 14, further comprising, tailoring the rendering of a third view, to the one of the at least one remote display.

20. The method of claim 14, the menu allowing the user to select a display format for at least one of the second view responsive to the first input and the third view responsive to the second input.

21. A system comprising:
   a portable computing device having a local display; and
   a remote display wirelessly coupled to the portable computing device;
   the portable computing device programmed to perform operations including:
      rendering in a first display format a first view of a first data series that is retrieved from a first data source, the first data series including first data elements for the local display, the first view presenting the first data series in a first display format and including a menu for each of the first data elements, each menu allowing a user to select a second data series related to the corresponding first data element and a second display format for the second data series; and responsive to a first input selecting the second data series and the second display format for the second data series, retrieving the second data series from a second data source that is located remotely from the first data source, wherein the second data source includes real-time data, rendering a second view of the selected second data series, displaying the second view on the local display in the second display format, discontiguous from the first view, and casting the second view to the remote display, including displaying the second data series on the remote display in a third display format that is different than the second display format; and controlling the second view by inputs to the local display.

22. The system of claim 21, further comprising a second remote display coupled to the portable computing device, the operations further including selecting another of the second data series, responsive to a second input, rendering a third view of the selected other of the second data series; and casting the third view to the second remote display.

23. The system of claim 21, the first view depicting the first data element as having a first face and a second face offering the menu.

24. The system of claim 23, wherein the second face appears orthogonal to the first face.

25. The system of claim 23, the operations including modifying the first view, responsive to a second input, to expand the second face.

26. The system of claim 21, the operations further including sensing a re-orienting of the local display and altering the second view responsive to the sensed re-orienting.

27. The system of claim 21, the operations further including, responsive to third input, navigating around the second view of the selected second data series on the remote display.

* * * * *

UNITED STATES PATENT AND TRADEMARK OFFICE
CERTIFICATE OF CORRECTION

PATENT NO. : 10,705,785 B2  
APPLICATION NO. : 15/456214  
DATED : July 7, 2020  
INVENTOR(S) : Ramakrishna Raju Vegesna and Sudheer A. Grandhi Page 1 of 1

It is certified that error appears in the above-identified patent and that said Letters Patent is hereby corrected as shown below:

In the Claims

In Column 11, Line 22, Claim 1 please delete the word "and".  
In Column 11, Line 32, Claim 1 please add a --;-- immediately following the word "display".  
In Column 13, Line 5, Claim 21 please delete the word "and".

Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*